March 31, 1959     C. A. SNYDER     2,879,863
FILTER DEVICE

Filed Jan. 2, 1957     2 Sheets-Sheet 1

INVENTOR.
Clyde A. Snyder

BY Ooms, McDougall,
Williams & Hersh
Attorneys

March 31, 1959 C. A. SNYDER 2,879,863
FILTER DEVICE
Filed Jan. 2, 1957 2 Sheets-Sheet 2

INVENTOR.
Clyde A. Snyder
BY Jones, McDougall,
Williams & Berth
Attorneys

2,879,863

Patented Mar. 31, 1959

2,879,863

FILTER DEVICE

Clyde A. Snyder, Mishawaka, Ind., assignor to Wheelabrator Corporation, Mishawaka, Ind., a corporation of Nebraska Application January 2, 1957, Serial No. 632,136

10 Claims. (Cl. 183—58)

This invention relates to a filter device for the removal of dust, dirt or other solid particles from air or other gaseous medium and it relates more particularly to a dust collector which makes use of a plurality of filter elements formed of a filter fabric through which the dust or dirt-laden air or other gaseous medium is advanced for separation of the dust or dirt particles onto the walls thereof as the air or other gaseous medium passes on through.

This invention is addressed to a filter device of the type described in the Snyder Patent No. 2,143,664 wherein a plurality of elongate tubular members of a filter fabric are suspended from their closed upper ends on hanger rods while the open ends of the tubular members at the bottom are secured by collars to a plate having openings in communication therewith for passage of the dust or dirt-laden air or other gaseous medium from the inlet plenum chamber into the tubular members for filtration through the fabric.

When the accumulation of dirt or dust separated from the air or other gaseous medium onto the inner walls of the filter fabric becomes so excessive as to interfere with the efficiency and operation of the device, it becomes necessary to clean the tubes by removing the dirt or dust from the walls of the filter fabric. For this purpose, the flow of dirt or dust-laden air into the inlet plenum chamber is cut off while the tubes are vigorously shaken to loosen the accumulated layers of dust and dirt which are allowed to fall gravitationally downwardly through the open end of the filter tubes at the bottom and through the inlet plenum chamber into a receiver from which the collected dust and dirt can be removed from the system.

For this purpose, the tubular members of filter fabric are suspended from hooks or hangers which are secured to opposite sides of shaker channels adapted to be rocked from one side to the other by suitable actuating means, generally indicated at S in Fig. 6. The details of said actuating means are described in Snyder Patent No. 2,143,664. Each of the plurality of shaker channels, each of which supports a plurality of such tubular members of filter fabric, are supported for rocking movement at their ends by a knife edge resting in a V-shaped bearing member or block fixed to the framework of the machine. These pivot points permit free rocking movement of the shaker channels supporting the filter tubes when actuated as by a suitable eccentric or other conventional shaking or rocking means. The knife edge on the shaker channel, which rests in the V-shaped supporting block, is subject to wear in service. When the wear becomes excessive, the knife edge begins to bind in the V-block, the power requirements for operation increase to the point of becoming excessive, and a decrease in the vigor of the shaking of the bag occurs. In addition, vibrations occur and the operation of the shaker produces excessive noises. Replacement of the supporting elements becomes necessary. Not infrequently, replacement is required after 1,000 hours of service or between 1,000 to 2,000 hours of service.

It is an object of this invention to produce a new and improved means for supporting the channel brackets for rocking movement and it is a related object to provide a means of the type described which enables quiet operation over periods of use many times greater than that heretofore available from the knife edge supports; which is not subject to wear and which does not require replacement as often as the knife edge supports described, and which maintains a desired assembled relationship over extended periods of use thereby to reduce the amount of time and money spent in maintenance of the machine and thereby also to increase the efficiency of operation.

These and other objects and advantages of this invention will hereinafter appear and for purposes of illustration, but not of limitation, an embodiment of the invention is shown in the accompanying drawing in which—

Figure 1:
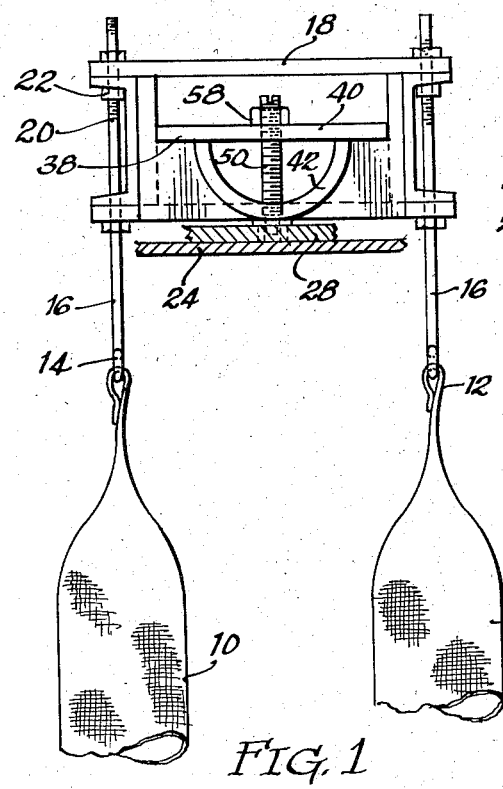
Figure 1 is a sectional elevational view of a portion of the filter device which embodies the features of this invention.
Figure 2:
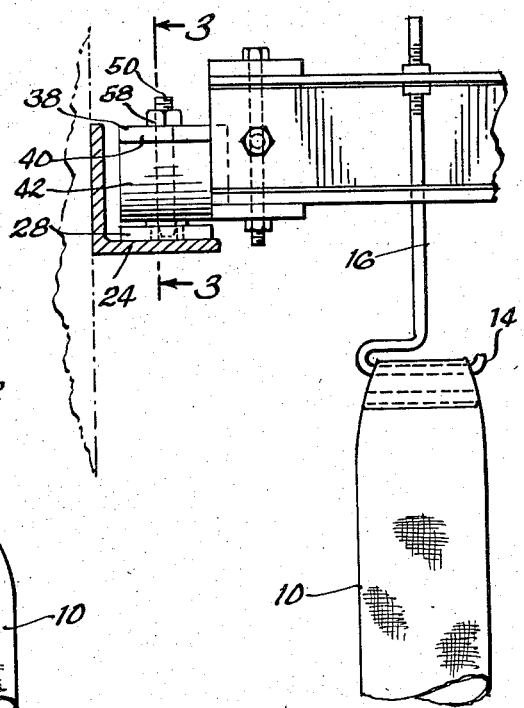
Figure 2 is a side elevational view in section of the fragmentary portion of the device shown in Figure 1.
Figure 3:
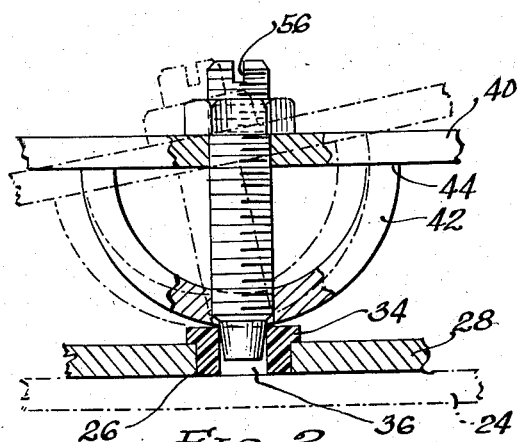
Figure 3 is an enlarged sectional elevational view taken along the line 3—3 of Figure 2.

The illustration made in the drawing is limited to the portion of the filter device which is directly related to the features of this invention. It will be understood that a plurality of filter tubes 10 formed of a filter fabric are supported at their ends 12 in longitudinally spaced apart relation from hooks 14 at the lower ends of hanger rods 16 secured in pairs to opposite sides of elongate shaker channels 18 formed of channel iron or other rigid and structurally strong material. The hanger rods 16 are screw-threaded at their upper ends 20 to enable vertical adjustment relative the supporting channels as by means of nut members 22 and the like. A plurality of such shaker channels are provided in laterally spaced apart parallel relation to support a large number of filter tubes 10 in what is referred to as the "bag house" which communicates with the inlet plenum chamber (not shown) at the lower portion of the filter device.

Figure 4:
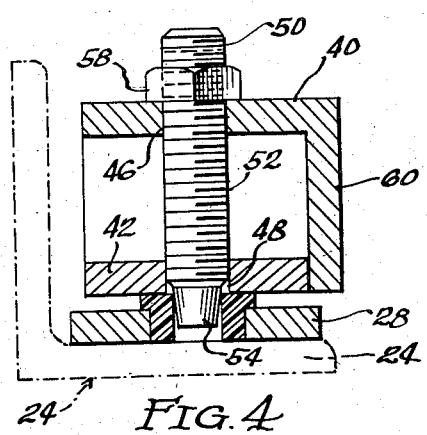
Figure 4 is a sectional view taken at right angles to the view in Figure 3.
Figure 5:
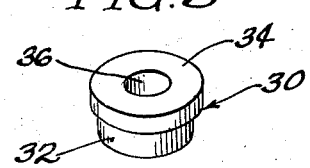
Figure 5 is a perspective elevational view of the bushing members shown in the foregoing figures.

An important concept of this invention resides in a new and novel means for supporting each of the shaker channels 18 at the opposite ends on the cross frame members 24 for enabling the supported shaker channels to be rocked from side to side during the shaking operation. As illustrated in the drawing, an opening 26 is provided in a cross bar or frame plate 28 secured to the cross frame member 24 with the opening 26 preferably in endwise alignment with the center portion of the supported shaker channel 18. Each of the described openings is fitted with a bushing 30 having a lower end portion 32 dimensioned to correspond to the diameter of the opening 26 so as to be received in fitting relationship therein, when in the assembled relation. The upper end portion of the bushing is provided with an annular flange 34 of larger dimension which extends laterally beyond the opening so as to rest upon the upper surface of the frame plate 28 about the opening. The bushing is provided with a bore 36 of uniform dimension which extends endwise therethrough. It is preferred to form the bushing of a plastic or synthetic resinous material as represented by polyamide, polytetrafluoroethylene or the like, plain, laminated or filled, but it may be formed of other resinous or rubber-like materials such as wood, chlorinated rubber, rubber, polyesters, polyethylene and the like synthetic resinous materials, or natural and treated woods, metals, sintered metal moldings and the like. While the opening 26 is illustrated as round in the drawings, it is preferred to form the opening as a slot extending crosswise in Figure 4 to allow for slight variations in the center to center distance of pins 50 and the possibility that supports 24 might not be true. These various materials can be used since the bushing merely provides an upper surface over which the bracket, hereinafter defined, rocks. As such, it will be understood that the bushing may be of uniform diameter throughout the length since the flanged portion is unnecessary for its support.

Rigidly secured to the ends of each of the shaker channels 18 are brackets 38 including a cross-bar 40 and an arcuate plate 42, preferably in the form of a metal plate of semi-cylindrical shape which is secured at its ends 44 to the underside of the cross-bar 40 with the curvilinear portion lowermost at rest upon the upper surface of the bushing 30. The cross-bar 40 and the curvilinear plate 42 are each provided with openings 46 and 48 respectively vertically aligned with the center of the curvilinear section 42 to receive an elongate pin 50 which extends vertically through the aligned openings. Throughout its major length, the pin is dimensioned to have a diameter corresponding with the diameter of the openings. A portion at the lower end of the pin which extends downwardly beyond the curvilinear plate 42, when in the assembled relation, is formed with a slight inward taper to provide a conical section dimensioned to be received in substantially fitting relationship within the bore 36 of the bushing.

Means are provided for vertical adjustment of the pivot pin 50 and for holding the pivot pin in the adjusted position. For this purpose, the upper end portion of the pin is formed with screw threads 52 threadably to engage the threads which are formed in the bar 40 about the opening 46. Thus the pin is capable of vertical adjustment within the supporting bracket as by turning movement of the pin in one direction or the other, as by means of a suitable tool adapted to be received within the slot 56 provided in the upper end of the pin or by other conventional turning means. A lock nut 58 is provided on the pin to secure the pin against inadvertent turning movement and to prevent displacement from the desired position of adjustment.

The bracket is preferably provided with a backing plate 60 interconnecting the cross-bar 40 and the curvilinear plate 42 at their ends to provide strength and rigidity to the structure and rigidly to fix the bracket to the ends of the shaker channel.

The bracket 38 may instead be fabricated in a single piece as a casting in which event, the arcuate member 42 would be in one piece with the cross-bar 40 and but a single threaded opening would extend upwardly through the casting for receiving the pin 50.

Figure 6:
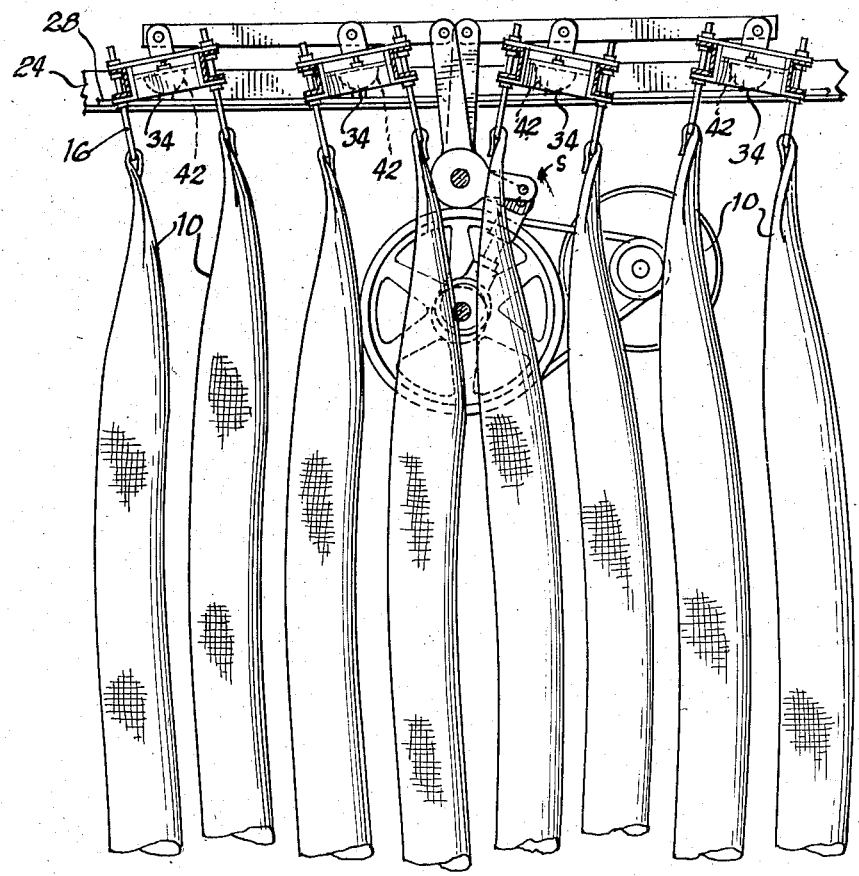
Figure 6 is a fragmentary elevational view of the shaker mechanism.

In operation, when the shaker mechanism illustrated in Figure 6 rocks the shaker channels 18 from side to side, the curvilinear rocker plate 42 rolls from side to side on the smooth upper surface of the frictionless and noiseless bushing 34 formed of non-metallic materials while the conical end portion 54 of the pin 50 extends into the bore 36 of the bushing to define the center of rock and to maintain the elements in the desired assembled relation.

It has been found that little, if any, wear occurs as between the rocker plate 42 and the bushing even after 4,000 hours of operation thereby to provide a life which is more than four times greater than that experienced with systems of the type heretofore employed. Coupled with this elimination of wear, the operation is smooth and noiseless so that quiet operation is secured even after many thousands of hours of use. In the event that wear should occur in any of the non-operating elements, as in the bushing, the bushing can be replaced in a simple and efficient manner without excessive cost in labor and materials and without the necessity to take the device out of service for any extended periods of time.

It will be understood that other changes may be made in the details of construction, arrangement and method of operation without departing from the spirit of the invention, especially as defined in the following claims.

I claim:

1. In a filter device having a frame, a plurality of shaker channels supported on the frame for rocking movement, means for actuating the shaker channels in rocking movement, a plurality of filter elements, and means interconnecting said filter elements with the shaker channels for supporting the filter elements in position of use and for shaking the filter elements during rocking movement of the supporting shaker channels, the improvement in the means for supporting a shaker channel for rocking movement on the frame comprising frame plates rigid with the frame and having an opening in endwise alignment with the center of the shaker channel, a bushing having a lower end portion dimensioned to be received in fitting relationship in said openings of the frame plate and having an upper end portion which extends beyond the surface of the frame plate, a member fixed to each of the ends of the shaker channel having an arcuate lower surface in position to overlie the frame plate and having an opening at the base of curvature aligned with the underlying bushing when in position of use, and a pin extending through the curvilinear plate into operative engagement with the bushing for establishing a guiding relationship therebetween whereby the curvilinear plate is supported on the bushing for rocking movement and is held thereon by the pin.

2. In a filter device having a frame, a plurality of shaker channels supported on the frame for rocking movement, means for actuating the shaker channels in rocking movement, a plurality of filter elements, and means interconnecting said filter elements with the shaker channels for supporting the filter elements in position of use and for shaking the filter elements during rocking movement of the supporting shaker channels, the improvement in the means for supporting a shaker channel for rocking movement on the frame comprising frame plates rigid with the frame each having an opening in endwise alignment with the center of the shaker channel, a bushing having a lower end portion dimensioned to be received in fitting relation in said openings of the frame plate and having an upper end portion which extends beyond the surface of the frame plate, a bracket fixed to each of the ends of the shaker channel having a curvilinear portion in position to rest upon the upper surface of the bushing and having openings through the curvilinear portion in alignment with the bore through the bushing, and a pin extending through the opening in said curvilinear portion and having a portion received in guiding relationship within the bushing to hold the bracket on the bushing during rocking movement thereof.

3. A filter device as claimed in claim 2 in which the curvilinear portion is of substantially semi-cylindrical shape with the curvature extending in the downward direction.

4. A filter device as claimed in claim 2 which includes means for vertically adjusting the pin endwise relative the bracket and means for securing the pin in adjusted position.

5. A filter device as claimed in claim 2 in which the end portion of the pin extending downwardly beyond the curvilinear portion into engagement with the bushing is of lesser diameter than the remainder of the pin.

6. A filter device as claimed in claim 2 in which the end portion of the pin in operative engagement with the bushing is of frusto-conical shape.

7. A filter device as claimed in claim 2 in which the bushing is formed of a polyamide resin.

8. A filter device as claimed in claim 2 which includes a cross plate and in which the bracket comprises a curvilinear plate fixed at its lateral edges to the underside of a cross plate to provide a unitary bracket assembly.

9. A filter device as claimed in claim 8 in which an opening is provided in each of the cross plates in vertical alignment with the openings in the curvilinear plate and in which the pin extends continuously through said openings for support in vertically spaced apart portions.

10. A filter device as claimed in claim 9 in which screw threads are provided in the upper end portion of the pin threadably to engage the threaded portions in the cross plate about the opening therein.

References Cited in the file of this patent

UNITED STATES PATENTS 2,143,664     Snyder _____ Jan. 10, 1939

FOREIGN PATENTS 569,617     Great Britain _____ May 31, 1945